No. 687,829. Patented Dec. 3, 1901.
C. H. KEENEY.
ELECTRIC CONTROLLER.
(Application filed Sept. 14, 1901.)

(No Model.) 2 Sheets—Sheet 1.

Witnesses. Inventor.
Anna V. Faust. Charles H. Keeney
Carrie H. Cooney By Benedict Morsell
 Attorneys.

No. 687,829. Patented Dec. 3, 1901.
C. H. KEENEY.
ELECTRIC CONTROLLER.
(Application filed Sept. 14, 1901.)
(No Model.) 2 Sheets—Sheet 2.
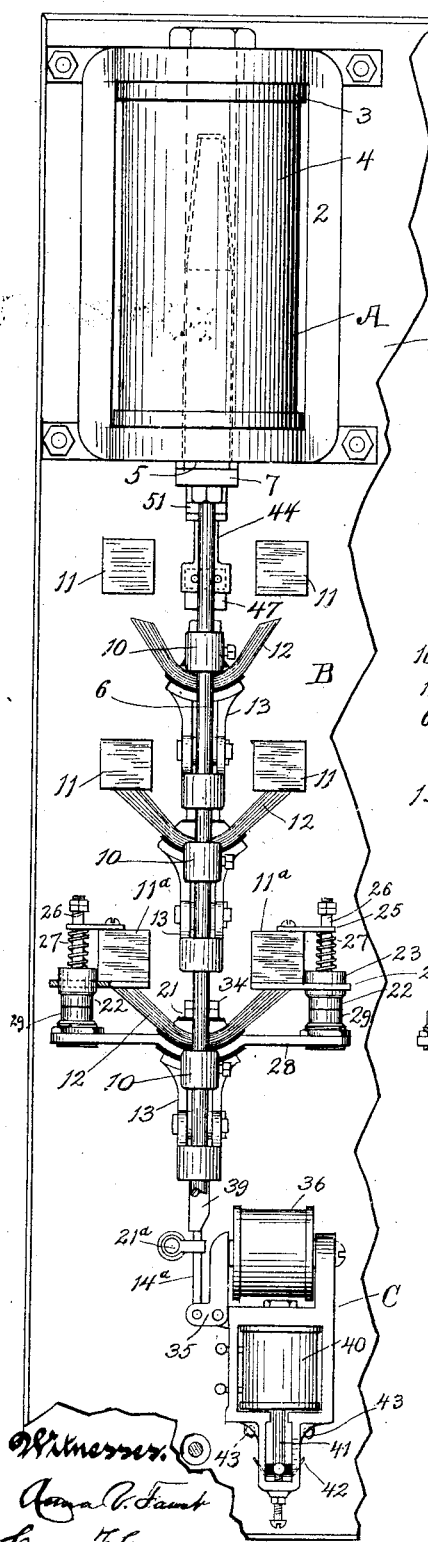

UNITED STATES PATENT OFFICE.

CHARLES H. KEENEY, OF MILWAUKEE, WISCONSIN.

ELECTRIC CONTROLLER.

SPECIFICATION forming part of Letters Patent No. 687,829, dated December 3, 1901.

Application filed September 14, 1901. Serial No. 75,412. (No model.)

*To all whom it may concern:*

Be it known that I, CHARLES H. KEENEY, residing at Milwaukee, in the county of Milwaukee and State of Wisconsin, have invented a new and useful Improvement in Electric Controllers, of which the following is a description, reference being had to the accompanying drawings, which are a part of this specification.

The object of my invention is to provide an improved electric-current controller adapted in an electric system to automatically control, reverse, and shut off the electric current.

The invention is directed chiefly to the novel construction and arrangement of the controller, including the electric system in which it is embodied and its various parts, whereby a maximum of efficiency is secured in a combination of devices having a minimum of parts.

The invention consists of the devices, their parts and combinations, as herein described and claimed, or the equivalents thereof.

Figure 1:
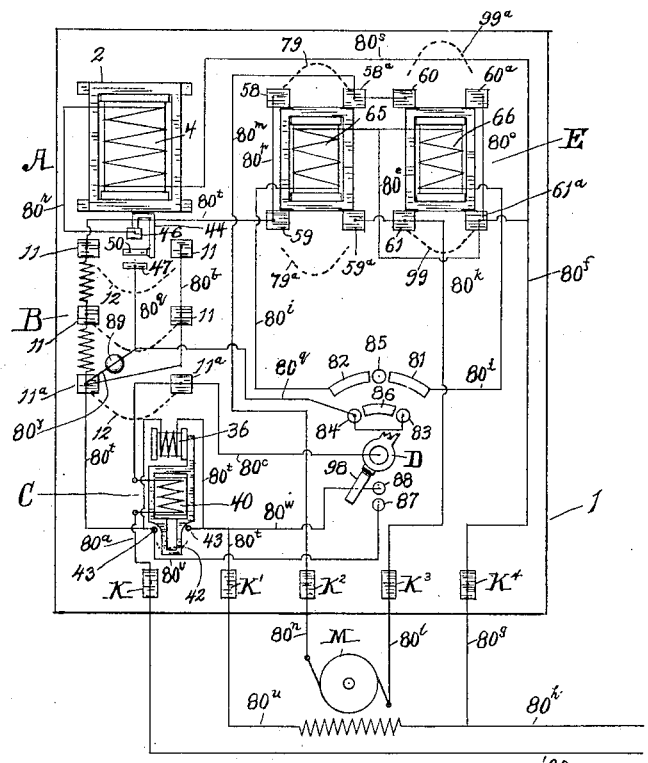
Figures 6, 7:
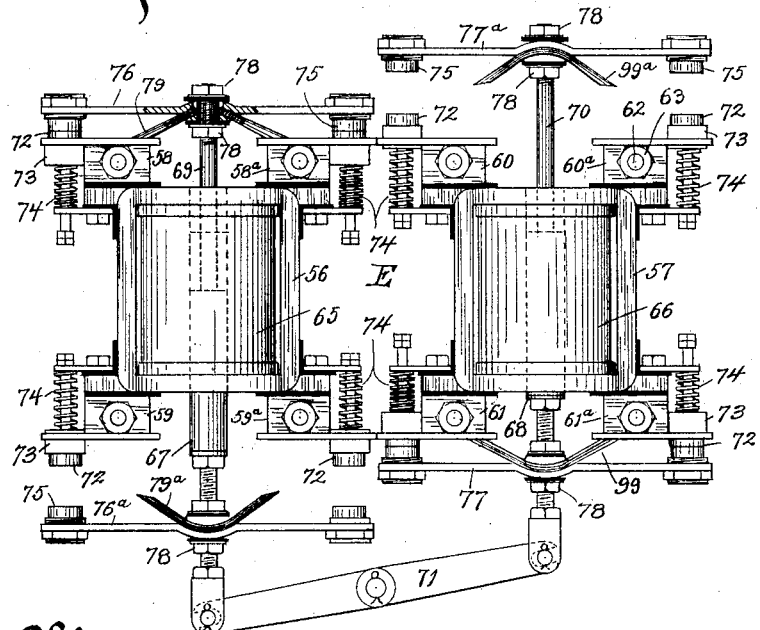

In the drawings, Figure 1 is a diagram of an electric system in which my improved devices may be employed, the devices embodying my invention being indicated thereon in suitable relations to the electric system. Fig. 2 shows a master-solenoid and devices therewith that are controlled or actuated thereby or related thereto. Fig. 3 is a side elevation of the solenoid and devices shown in Fig. 2. Fig. 4 is a detail, partly in section, of devices shown in Figs. 2 and 3. Fig. 5 is a front view of an auxiliary frame supporting a brush circuit-closer. Fig. 6 is a front view, partly in section, of a solenoid-reversing switch; and Fig. 7 is an edge view of the reversing-switch shown in Fig. 6.

My present invention is embodied in several devices or sets of devices and their connections and relations to each other in an electric-motor system, which may be such as is shown in Fig. 1; and for convenience of reference and description these devices or sets of devices may be designated as follows: A master-solenoid A, a plurality of circuit-closers B, an automatic cut-off C, a hand-switch D, and a solenoid-reversing switch E. Besides these there are other electrical and mechanical devices going to make up the complete mechanism, but which it is not important to segregate or specifically individualize.

The electric connections of the several electrical devices are shown on the diagram, Fig. 1, and the several lines thereof are hereinafter described and the operations of the devices in connection with the lines are explained.

In the drawings, 1 represents a slab of slate which is adapted to be affixed in an upright position to a suitable support, and this slab or slate serves as a suitable support for the devices embodied in my invention and as an insulator therefor. Any equivalent means of support and insulation for the devices may be employed, but a slate is deemed preferable. A solenoid-frame 2 is secured detachably to the slate, and a solenoid-spool $e$ and its coil 4 are mounted in the frame substantially as is common in the construction of solenoids. A soft-iron solenoid-plunger 5 is loose and is adapted to move vertically in the spool of the solenoid. A lifting-bar 6 is secured conveniently by an arm 7 to the lower end of the plunger 5 and depends vertically therefrom. The bar 6 is advisably provided with a piston-valve 8, which enters a dash-pot 9 and is adapted to act on a liquid medium in the dash-pot, whereby the too rapid elevation of the lifting-bar is prevented when it is lifted by the energizing of the master-solenoid. The lifting-bar 6 is also provided with a number of catches 10, secured adjustably thereon, the number of catches corresponding with the number of devices to be engaged thereby, as hereinafter set forth.

A plurality of sets of line-terminal contact-pieces 11 11 and 11$^a$ are mounted in sets one above the other on the slate 1 and adjacent to the lifting-bar 6. In the drawings three sets of these contact-pieces are shown; but the number may be increased to any extent required, or no more than two sets may be employed. These contact-pieces are severally terminals in lines of the electric system. A number of electric-circuit closers 12 12, preferably constructed of laminated copper and corresponding in number with the sets of contact-pieces 11 and 11$^a$, are so mounted as normally to be out of contact with the contact-pieces 11 11$^a$, but to be capable of being lifted, and thereby put severally one after another into electrical contact with their several sets of contact-pieces 11 or 11ᵃ. Each of the brush circuit-closers 12 is mounted on an auxiliary frame 13, which frame is slidable vertically at one side on the lifting-bar 6 and at the other side on shifting-rods 14 14ᵃ, which rods are mounted slidably endwise vertically in posts 16, fixed on the slab 1. Each of the frames 13 is provided with a hook 17, pivoted thereon and advisably in bell-crank form. A tilting-rod 18, slidably endwise vertically in the frame 13, passes loosely through an aperture therefor in one arm of the bell-crank hook 17 and is held therein by a pin through the upper extremity of the rod. The hook-tilting rod 18 is held downwardly by a spring 19, and thereby the hook 17 is tilted rearwardly out of the path of the catch 10, with which the hook 17 is adapted to engage when the hook is tilted forwardly into the path thereof. A spring 20, about the rod 18, under the arm of the hook 17, is adapted to hold the hook yieldingly forward in the position shown in Fig. 4, so that the hook when the rod 18 is elevated, as shown in Fig. 4, will be in the path of the catch 10, but permitting the hook to yield rearwardly sufficiently to permit the catch to pass the hook when the bar 6 goes down and causing the hook to resume such position as to be caught by the catch and held thereto releasably, thereby lifting the frame 13 as the bar 6 is elevated. A nut 21 on each of the frames 13 below the uppermost one serves as a buffer that on the movement of any of these frames 13 upwardly will contact with and lift the rod 18 in the frame 13 above it, tilting the hook 17 into the position shown in Fig. 4.

The lowest set of contact-pieces 11ᵃ are provided with auxiliary contact-pieces 22 22, which auxiliary contact-pieces 22 are advisably of carbon, being mounted in metal cups 23, movable vertically in guide-frames, consisting of the metal arms 24 25, which are affixed to the contact-pieces 11ᵃ. The cup 23 is provided with a standard 26, that passes loosely through the frame member 25 and is provided with stops consisting of a nut or nuts on its upper end for limiting the movement of the cup and auxiliary contact-piece downwardly. A spring 27, coiled about the standard 26 below the frame member 25, holds the cup 23 and the auxiliary contact-piece downwardly yieldingly. A metal bar 28 is mounted and insulated on the lowest frame 13, and this bar is provided with carbon contact-pieces 29 29, registering with and adapted to contact the pieces 22 22. This device forms an electric break for the electric line, of which the contact-pieces 11ᵃ are terminals, the break being adapted to close the line in advance of the closing accomplished by the brush 12 belonging to this set of terminal pieces when this lowest frame 13 is first lifted by the master-solenoid. The brushes 12 are insulated on the frames 13 as well as the break-bar 28.

In connection with each of the frames 13 there is a supporting-hook 30, suspended loosely on a pin fixed in the post 16, suitably located therefor, and these hooks are adapted each to engage releasably a shoulder or catch 31 on the frame 13. These hooks are held yieldingly normally in a suspended position out of the path of the shoulder 31 by a spring 32, but are adapted to be slightly tilted into the path of the shoulder by means of a button-cam 33, secured adjustably on the rod 14 and 14ᵃ. The rod 14 at its lower end is provided with a laterally-projecting arm 34, and the rod normally rests on the post 16 immediately below its lower end. The arm 34 projects above and in the path of the lowest frame 13 and so as to be contacted directly by the nut 21 thereon and lifted thereby as the auxiliary frame 13 goes up. By the movement upwardly of the rod 14 the cams 33 force the hooks 30 into the path of the catches 31, and as each of the frames 13 is raised its catch 31 is carried past the hook 30 and is then engaged thereby, whereby the frame 13 is held in this elevated position, holding the circuit-closer 12 in contact with the terminal pieces 11 until the frame is released from the hook 30, which release is accomplished by the slipping of the hook from beneath the catch when the hook is no longer held up to its work by the cam 33. The cams 33 are withdrawn by the descent of the rod 14, which occurs by gravity when the rod is no longer supported by the lowest frame 13. The rod 14ᵃ, which is substantially a prolongation of the rod 14 and is provided with a cam 33, that bears against the lowest hook 30, is pivoted at its lower end to one arm of a bell-crank armature-frame 35 and is lifted and held upwardly by the action of the bell-crank frame when the armature thereon is held to its electromagnet 36 by the energizing thereof electrically. The rod 14ᵃ is released and drops down by the tilting of the bell-crank frame 35 when the armature is released. The lower end of the rod 14ᵃ is advisably jointed at 37 to the upper portion of the rod, and a stop 38 on the rod may be employed as an additional means for limiting the movement of the rod downwardly, the stop resting on the lowest frame 13. The coil of the electromagnet 36 is in a shunt-line of the electric system. A cam 39, projecting downwardly from the lowest frame 13, is adapted to contact wedgingly with an arm of the bell-crank frame 35 and tilt the frame to a position in which the armature thereon is substantially in the position shown in Fig. 2 when the lowest frame 13 is at the lowest limit of its travel—that is, in its position when at rest.

In connection with the electromagnet 36 a solenoid 40 may also be employed. The electromagnet is adapted by the release of its armature when the electrical energy becomes very light to let down the rod 14ᵃ, and thereby let down the lowest frame 13, and consequently all the other frames 13, thus opening all the electric lines closed by the circuit-closers 12 and the break 28, thus putting the motor out of action when the current becomes too weak. The solenoid 40 is adapted when there is an overload of the electric current through the electromagnet 36 to short-circuit the electromagnet, and thereby to take care of the overload. This solenoid 40 has the usual spool and coil with a soft-iron core or armature 41 and a circuit-closer 42, adapted to contact with the line-terminal contact-pieces 43 43 in a shunt of the line that includes the coil of the electromagnet 36. The specific form of the electromagnet 36 and the solenoid 40 is not material to this invention; but I preferably employ devices like those shown in my Patent No. 677,360, issued to me July 2, 1901. The frame of the electromagnet 36 and the solenoid 40, as well as the contact-pieces 43, may be supported on the slate 1.

In the electric circuit that includes the coil 4 of the master-solenoid there is a circuit-closer 44, preferably in the form of a metal slide, provided with a guide-rod 45, that is movable endwise in a block 46, fixed on the slate 1. This block 46 is one of the line-terminal contact-pieces, and the other terminal contact-piece 47 is also secured to the slate 1. The circuit-closer 44 is provided with a carbon point 48, which fits movably in the metal portion of the circuit-closer 44 and is forced outwardly yieldingly by a spring 49, secured to and fulcrumed on the metal portion of the circuit-closer. Normally the carbon point 48 rests on a block 50 of insulating material, which is fixed on the slate 1, adjacent to the terminal contact-piece 47. The construction and disposition of the block 50 and the terminal contact-piece 47 are such that the carbon point 48 can slide from one to the other as the circuit-closer is shifted vertically. The circuit-closer is held in position movably by the frictional contact of the carbon point 48 on the block 50 and contact-piece 47. When the solenoid-plunger 5 is drawn into the solenoid, as shown in Fig. 2, and the bar 6 is thereby lifted into the position shown in Figs. 2, 3, and 4, an arm 51 of insulating material, secured to the lower end of the plunger 5, engages a projecting part of the circuit-closer 44 and lifts the circuit-closer and holds it in the position shown in Fig. 4, in which the electric circuit of the coil of the master-solenoid is open. When the plunger 5 goes down, the arm 51 engages an adjustable member 52 on a projecting finger 53 of the circuit-closer 44 and moves the circuit-closer down until the carbon point 48 contacts with the terminal piece 47, thereby closing the electric circuit of the master-solenoid coil. When the uppermost frame 13 is lifted to its elevated position, an arm 54 of insulating material fixed on the frame engages an adjustable member 55 on the finger 53 and lifts the circuit-closer 44 into the position shown in Fig. 4, in which the electric circuit of the master-solenoid is open, and holds it in this position so long as the frame 13 is held in this elevated position by its hook 30.

The solenoid-reversing switch (designated E and shown in detail in Figs. 6 and 7) consists of two solenoids and mechanism and apparatus in connection therewith for closing and reversing electric lines. The metal frames 56 57 of these solenoids are mounted in insulation conveniently on the slab 1. The means for mounting these solenoid-frames or solenoid-poles which I prefer is shown in Figs. 6 and 7, in which projections on the frames 57 are secured directly to electric-line-terminal contact-pieces 58 58$^a$, 59 59$^a$, 60 60$^a$, and 61 61$^a$ by bolts or screws. These contact-pieces are severally fixed on the slab 1, preferably by means of a threaded metal rod 62, which forms electrically a part of an electric circuit. Nuts 63 63 turn on the rod 62, one against each side of a contact-piece, and clamp it in position adjustably on the rod. Another nut 64 turns on the rod against the surface of the slate, and a corresponding nut may be employed on the other side of the slate, turning on the rod to secure the rod in position in the slate. The solenoid-coils 65 66 are wound on spools and are mounted in the frames 56 and 57, respectively, in the usual manner of solenoids. The plunger-armatures 67 68 for these coils are provided, respectively, with shifting-rods 69 70, which project axially therefrom in both directions and at their lower extremities are pivoted to a vibrating lever 71, pivoted centrally on a suitable support, conveniently on the slate 1. This construction secures a reversely synchronous movement of the plungers 67 68 in the solenoid-coils and of the circuit-closers mounted on the rods 69 and 70. Each of the line-terminal contact-pieces shown in Figs. 6 and 7 is provided with a carbon contact-piece 72, mounted in a metal cup 73, which is movable endwise in a metal arm therefor, secured to and forming a part of the contact-piece. The carbon contact-piece is held to advanced position yieldingly by a spring 74. The construction is substantially like that shown and described in connection with the carbon contact-pieces 22. For each of these carbon contact-pieces 72 a complementary carbon contact-piece 75 is provided, which complementary contact-pieces are mounted in pairs on four metal break-bars 76 76$^a$, 77 77$^a$, severally mounted on the rods 69 and 70, one bar at each end of each rod. These bars are provided with enlarged apertures, through which the rods 69 and 70 respectively extend, and the bars are curved at this point, so as to be capable of a slight tiltable adjustment on the rods. The bars are secured in place on the rods by nuts 78, turning by screw-thread on the rods at the two sides of the bars. The bars are insulated on the rods. This construction forms a plurality of circuit-closers in sets of the style and character known as "breaks." For closing the electric circuits between each set of line-terminal contact-pieces shown on Fig. 6 a circuit-closer, preferably of laminated copper, is employed, and these circuit-closers 79, $79^a$, 99, and $99^a$ are severally mounted in pairs on the shifting-rods 69 and 70, respectively, above and below sets of terminal contact-pieces. The construction and disposition of the parts are such that the circuit-closer 79 will contact with the terminal pieces 58 and $58^a$ at the same time that the circuit-closer 99 will contact with the terminal pieces 61 and $61^a$ and so that the circuit-closer $79^a$ will contact with the terminal pieces 59 $59^a$ at the same time that the circuit-closer $99^a$ contacts with the terminal pieces 60 $60^a$ and by reversal that these circuit-closers will in the same relation be separated from the terminal pieces, thus opening the circuits correspondingly.

Referring to the diagram, Fig. 1, which illustrates a system of electric-line wiring in connection with the several devices combined in my invention, it will be noted that the devices and wiring there shown above and including the binding-posts K are mounted on the slate 1, and in this form are adapted to be connected up through the binding-posts K to the motor M and to the two lines of the electric circuit 80 $80^h$.

In referring to the electric lines that are shown on the diagram it is found convenient to trace them and refer to them as directly follows; but I do not wish to be understood as stating that the electric current runs in or on the wires in the directions indicated, as with a medium so subtle as electricity and so instantaneously permeating in all directions in which a suitable conductor is found it is not proper to speak of electricity as running in a certain channel or line.

Commencing, for a convenient starting-point, with the line 80, which runs to a binding-post K, the line continues as $80^a$, including the coil of the solenoid 40, to a contact-piece $11^a$. From said contact-piece $11^a$ a line (designated $80^c$) runs to the metal switch D, pivoted on the slate 1. From a terminal contact-piece 81, fixed on the slate 1, a line $80^d$ runs to and forms the solenoid-coil 66 in the reversing-switch and thence is continued in the line $80^e$ to terminal contact-piece $61^a$, and therefrom, as the line $80^f$, to the binding-post $K^4$, and thence by a line $80^g$ to the main line $80^h$. From a terminal contact-piece 82, fixed on the slate 1, a line $80^i$ runs to and forms the solenoid-coil 65, and thence to the line $80^e$. A line $80^k$ connects the two terminal contact-pieces $59^a$ and 61 and runs thence to the binding-post $K^3$, and from thence, as the line $80^l$, to one side of the armature of the motor M. A line $80^m$ connects the two terminal contact-pieces 60 and $58^a$ and thence runs to the binding-post $K^2$, and therefrom, as line $80^n$, to the other side of the armature of the motor M. A line $80^o$ connects the terminal contact-pieces $60^a$ and $61^a$. A line $80^p$ connects the terminal contact-pieces 58 and 59. Switch contact-pieces 83 and 84, fixed in the slate 1, are connected by a line $80^q$, which runs therefrom to the terminal contact-piece 47, adapted to be contacted by the circuit-closer 44. A line $80^r$ runs from the contact-piece 46 to and forms the solenoid-core 4, and thence as line $80^s$ is continued to the line $80^f$. A line $80^t$ runs from the terminal contact-piece 59 to the several contact-pieces 11 and $11^a$, forming one side of the several sets of contact-pieces 11 and $11^a$, and thence to and forms the coil of the electromagnet 36, and thence to the binding-post $K'$, where it connects with the motor shunt-line $80^n$ and leads to the line $80^h$. Between the contact-pieces 11 and $11^a$ resistant mediums are employed in the line $80^t$. A line $80^b$ runs from the line $80^t$, at post $11^a$ therein, to the other set of terminals 11 11. From the line $80^t$ a branch line $80^v$ runs through a contact-piece 43, and thence to a terminal contact-piece 87, fixed in the slate 1, and from an adjacent contact-piece 88, fixed in the slate 1, a branch line $80^w$ leads by way of line $80^t$ to the other contact-piece 43. A line $80^y$ connects line $80^q$ to the contact-piece $11^a$, connected to line $80^t$. A lamp 89 is advisably employed in line $80^y$ as a resistance.

The construction and disposition of the switch D and parts relating thereto are such that the switch D when in an upright position will rest on the insulating-block 85 between the contact-pieces 81 and 82 and also on the segmental elongated insulating-block 86 between the contact-pieces 83 and 84. When the switch is swung either to right or left, it first contacts with 81 or 82, and thereafter on being swung farther away from the block 85 contacts coincidently with 83 or 84. A rearwardly-extending insulated metal member 98 of the switch D is adapted to contact coincidently with the terminal pieces 87 and 88, serving as a circuit-closer.

In use my improved controller, including the necessary wiring or electric lines, (which may be as shown in the diagram Fig. 1 and connected up to a motor, as M, and to a source of electric energy by lines, as 80 and $80^h$,) would operate substantially as follows: Assuming the controller to be non-active or dead, with the switch D resting on the insulating-blocks 85 and 86 and on the blocks 87 and 88, the core of the master-solenoid being at the lowest limit of its travel and all the electric lines in which the contact-pieces 11 and $11^a$ are included being accordingly open, thereupon on swinging the switch D—say to the right—it first contacts with terminal contact-piece 81, whereupon the solenoid-coil 66 of the reversing-switch is energized and the core 68 is drawn up and mechanically core 67 is pulled down, closing the circuit of the motor-armature in such manner as to cause the motor to rotate in one direction—say to the right— when the line shall be supplied with sufficient electric current therefor. A further movement of switch D puts it in contact with contact-piece 83, whereupon the master-solenoid A is energized and also the electromagnet 36. The core of the solenoid A is thereby drawn up and the bar 6 is lifted, raising the lowest frame 13 engaged by the lowest latch 10. The rod 14$^a$ is held up, notwithstanding the withdrawal of the cam 39, by the energizing of the electromagnet 36. The break 28 is thereby first made to close the electric line of the contact-pieces 11$^a$, and immediately afterward the lowest circuit-closer 12 contacts with the same contact-pieces 11$^a$ and closes the circuit additionally electrically. This starts the motor, but through all the resistance in the controller. The frame 13 being thus lifted is caught and held up mechanically by its hook 30. As the core 5 approaches the upper limit of its travel in the master-solenoid the arm 51 catches the slide circuit-closer 44 and carrying it along opens the line of the master-solenoid coil 4, cutting the solenoid out of the circuit, permitting the core 5 and the bar 6 to drop by gravity. When the core 5 and bar 6 approach the lowest limit of their travel, the arm 51 engages the member 52 and carries the circuit-closer 44 down with them, thereby again closing the circuit of the master-solenoid coil 4. The movement of the core 5 upwardly is then repeated, carrying upwardly therewith the second circuit-closer 12, cutting out some of the resistance of the controller. The master-solenoid is again deënergized by the shifting of the circuit-closer 44, and the core of the master-solenoid and the bar 6 drop, closing the circuit by the circuit-closer 44, whereupon the bar 6 is again lifted, carrying the succeeding circuit-closer 12 and cutting out more of the resistance of the controller. In the form shown in the drawings, where only three circuit-closers 12 are shown, this last movement cuts out all the resistance of the controller. When the uppermost circuit-closer 12 is carried up and closes its circuit, the circuit-closer 44 is again, as before, slid upwardly, opening the circuit of the master-solenoid, and as the core 5 drops the arm 51 engages and rests on the member 52 of the slide circuit-closer 44; but the frame 11, carrying the uppermost circuit-closer 12, is provided with an arm 54, that receives thereon the member 55 of the slide circuit-closer and supports the circuit-closer against being moved down far enough to close the electric line, and also the circuit-closer 44, being thus prevented from going down, supports thereon the bar 6 against falling. On swinging the switch D back to block 85 the lower insulated circuit-closing member 98 of the switch will contact the pieces 87 and 88, closing their circuit, thereby short-circuiting the electromagnet 36, deënergizing it and permitting the armature-frame 35 to tilt, letting down the rod 14$^a$ and permitting the hook 30 to slip from beneath the lowest frame 13, which thereupon drops and lets down rod 14, permitting the hooks 30 above to slip from beneath the other frames 13, allowing them to drop by gravity. The apparatus is then in initial non-active position. The dropping of the lowest frame 13 opens the circuit closed by the break 28 and cuts out the motor. By swinging the switch D to the contact-pieces 82 and 84 the same movements and operations are obtained, except the reverse movement of the motor, secured by the reversing of the switch E.

In case of an electric underload of the electric current the electromagnet 36 releases its armature and the bell-crank frame 35 tilts, letting down rod 14$^a$ and cutting out the motor electrically, the same as if the switch D were swung to the block 85. In case of an electric overload the solenoid 40 draws up the core 41 closing the circuit of the contact-pieces 43 43, cutting out the electromagnet 36 and permitting its armature-frame 35 to tilt, permitting the rod 14$^a$ to drop, resulting in cutting out the motor as in other cases of the dropping of the rod 14$^a$.

What I claim as my invention is—

1. In an electric-controller system, a single solenoid and its reciprocable core, means actuated by the movement of the solenoid-core in one direction for successively cutting out resistance, and mechanical means for putting in the resistance.

2. In an electric controller, a single solenoid and its reciprocable core, a plurality of circuit-closers adapted to be moved separately and successively by the repeated movements of the core into contact with their respective sets of circuit contact-pieces.

3. In an automatic electric-controller system, a single solenoid and its core, a means attached to and actuated by the core for initially closing an electric circuit, and other means attached to and actuated by the core for successively cutting out resistance after the initial closing of the circuit.

4. In an electric-controller system, a solenoid and its core, a means attached to and actuated by the core for initially closing an electric circuit, other means attached to and actuated by the core for successively cutting out resistance after the initial closing of the circuit, and means for automatically breaking the initial closure by a predetermined underload overload or breaking of electric current.

5. In an electric controller, a master-solenoid and its core, a plurality of circuit-closers adapted to be moved separately and successively into contact with their respective sets of circuit contact-pieces, means secured to and moved by the core of the solenoid for moving the circuit-closers to their contact-pieces, and other means for holding the circuit-closers releasably in contact with the contact-pieces.

6. In an electric controller, a master-solenoid and its core, a plurality of circuit-closers mounted movably, means attached to the solenoid-core adapted to bring the circuit-closers singly successively to closure with their several electric lines, other means adapted to hold the circuit-closers releasably in closure with their lines, and means for automatically releasing the circuit-closers and permitting them to break their closures with their lines.

7. In an electric controller, a master-solenoid and its core, a plurality of circuit-closers, means carried by the core adapted to close up the circuit-closers, means to hold the circuit-closers in closure releasably, an electromagnet adapted when energized to lock said last-enumerated means and when deënergized to release said means and permit the circuit-closers to break their closures.

8. In combination, in an electric-controller system, a master-solenoid and its core adapted to close up circuit-closers, an electromagnet adapted to release the circuit-closers, and a solenoid-reversing switch for reversing the electric current.

9. In combination in an electric-controller system, a master-solenoid and its core adapted to close up circuit-closers, an electromagnet adapted to release the circuit-closers automatically on underload of electric current, and a solenoid and its core adapted on overload of electric current to short-circuit said electromagnet causing it to release said circuit-closers.

10. In an electric controller, a solenoid and its core a bar attached to said core and movable therewith, a circuit-closer, a movable frame on which the circuit-closer is mounted, and means adapted to connect said frame to said bar releasably.

11. In an electric controller, a solenoid and its core, a bar attached to said core and provided with a catch, a movable frame having a circuit-closer fixed thereon, and means mounted on the frame adapted automatically to engage and be released from the catch on said bar.

12. In an electric controller, a solenoid and its core, a bar attached to said core provided with a catch, a movable frame having a circuit-closer fixed thereon, means mounted on the frame adapted automatically to engage and be released from the catch on said bar, and other means adapted to engage and hold said frame and circuit-closer releasably in a position to which it has been brought by the bar.

13. In combination in an electric controller, a movable frame having a circuit-closer mounted thereon, a bell-crank hook mounted on the frame, a spring-withheld actuating-rod adapted to be thrust against and to tilt the hook, and a yielding supporting-hook adapted to be put into engagement with and hold said frame releasably.

14. In combination in an electric controller, a movable frame having a circuit-closer mounted thereon, a bell-crank hook mounted on the frame, a spring-withheld actuating-rod adapted to be thrust against and to tilt the hook, a yielding supporting-hook adapted to be put into engagement with and hold said frame releasably, and means for moving up and locking said supporting-hook releasably.

15. In an electric controller, a plurality of circuit-closers adapted to be lifted successively into closure with their lines, a vertically-reciprocable bar provided with means for severally and successively engaging and lifting said circuit-closers, and a dash-pot into which a piston on the bar plunges adapted to retard the motion of the bar downwardly and thereby to increase the time between the movements of the bar upwardly.

16. In an electric controller, a master-solenoid and its core, a bar attached to and adapted to be lifted by the energizing of the solenoid, a plurality of circuit-closers one above the other adapted to be severally successively lifted by the bar into closure with their several lines, the lowermost closer being arranged to be lifted first, and means adapted to hold said lowermost closer in closure when it has been lifted to closure.

17. In an electric controller, a master-solenoid and its core, a bar attached to and adapted to be lifted by the energizing of the solenoid, a plurality of circuit-closers one above the other adapted to be severally successively lifted by the bar into closure with their several lines, the lowermost closer being arranged to be lifted first, means adapted to hold said lowermost closer in closure when it has been lifted to closure, and independent means adapted to hold each closer above the lowermost one in closure when each closer has been lifted thereto.

18. In an electric controller, a master-solenoid and its core, a bar attached to and adapted to be lifted by the energizing of the solenoid, a plurality of circuit-closers one above the other adapted to be severally successively lifted by the bar into closure with their several lines the lowermost closer being arranged to be lifted first, means adapted to hold said lowermost closer in closure when it has been lifted to closure, and independent means adapted to hold each closer above the lowermost closer in closure when severally lifted thereto, said last-enumerated means being arranged to be put into position to support the circuit-closers above the lowermost one by the elevating of the lowermost circuit-closer.

19. In an electric controller, a master-solenoid and its core, a bar attached to and adapted to be lifted by the energizing of the solenoid, a plurality of circuit-closers one above the other adapted to be severally successively lifted by the bar into closure with their several lines the lowermost closer being arranged to be lifted first, means adapted to hold said lowermost closer in closure, and an electromagnet adapted by an underload of current thereon to release means for holding the lowermost closer in closure and permit that closer to drop breaking the circuit.

20. In an electric-controller system, a single master-solenoid and its core, a plurality of contact-pieces adapted by the reciprocation of the core caused by the energizing and deënergizing of the solenoid for successively cutting out additional resistance in the electric system, and a circuit-closer actuated by the reciprocation of said core to automatically cut out and to cut in the solenoid-line.

21. In an electric-controller system, a master-solenoid and its core, a plurality of circuit-closers disposed and adapted by the reciprocation of said core caused by the energizing and deënergizing of the solenoid to successively cut out resistance in a main electric circuit, a circuit-closer actuated by the reciprocation of said core to automatically cut out and to cut in the solenoid-line, and means on the last moved of the successively-movable resistance cut-out circuit-closers adapted to block said solenoid-line circuit-closer and prevent it from moving to place to cut in the solenoid-line.

22. In a solenoid-reversing switch, a pair of solenoids and their cores, means connecting said cores mechanically so that when one is drawn into its solenoid by electric energy the other will be withdrawn from its solenoid mechanically, and circuit-closers at both ends of both solenoid-spools connected to the cores and adapted to be closed reversely in sets by the energizing electrically of one or the other of the solenoids.

23. In a solenoid-reversing switch, a solenoid and its core, a circuit-closer mounted on the outer end of said core, a non-magnetic extension of the inner end of said core, and a circuit-closer mounted on the non-magnetic extension of the core.

24. An electric controller employed in starting a motor comprising a single solenoid and its core, and means whereby each movement of the core in one direction will cut out a unit of resistance in the armature-circuit of an electric motor.

25. In combination, a single solenoid and its core arranged to reciprocate, and means actuated by the core whereby the initial movement of the core will close a circuit and each succeeding duplicate movement in one direction will close a circuit and cut out a unit of resistance.

26. In an electric-controller system, a single solenoid and its therein-reciprocating core, and a series of devices moved by the core for successively cutting out a new unit of resistance mechanically each time the solenoid is energized.

27. In an electric-controller system, a solenoid and its core, means for successively cutting out a unit of resistance mechanically each time the solenoid is energized, and other means for breaking the initial circuit and setting in all of the units of resistance.

28. In an electric-controller system, a solenoid and its core, means for successively cutting out a unit of resistance mechanically each time the solenoid is energized, and other means for breaking the initial circuit and setting in all of the units of resistance at a predetermined overload or underload of the electric current.

In testimony whereof I affix my signature in presence of two witnesses.

CHARLES H. KEENEY.

Witnesses:
ANNA V. FAUST,
C. T. BENEDICT.